Nov. 15, 1949  V. E. PRATT ET AL  2,488,434
PAD OF SENSITIZED PAPER
Filed Aug. 30, 1945  2 Sheets-Sheet 2
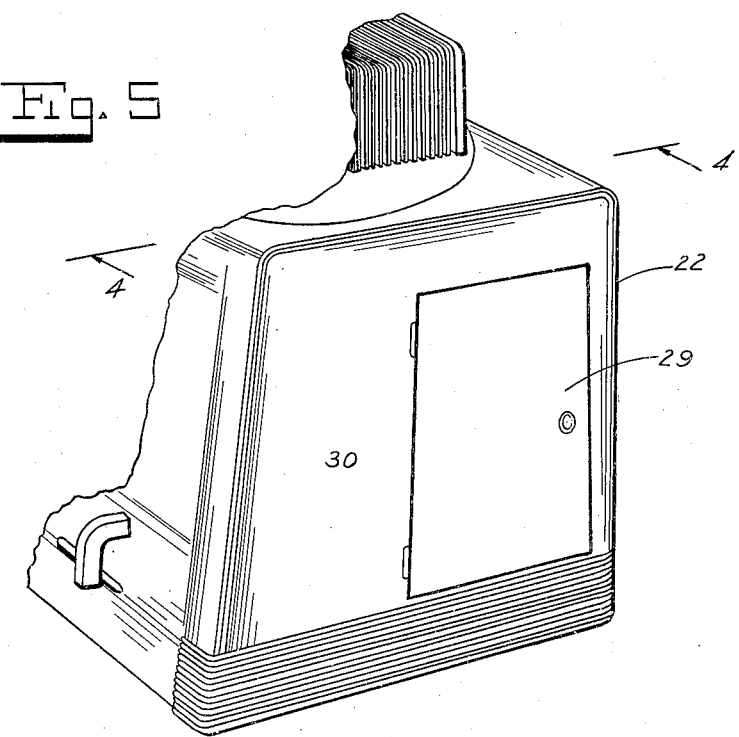
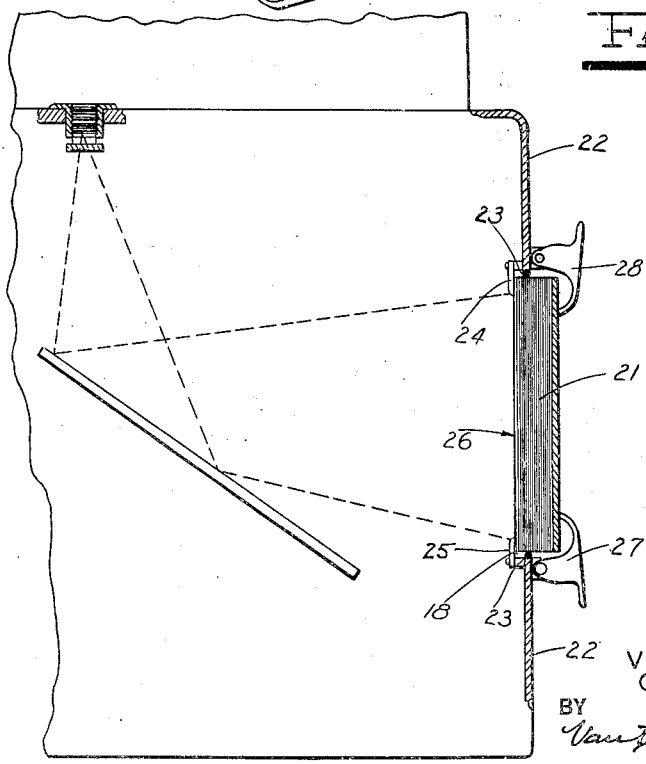
INVENTORS
VERNEUR E. PRATT
GEORGE F. GRAY
BY
ATTORNEYS Patented Nov. 15, 1949

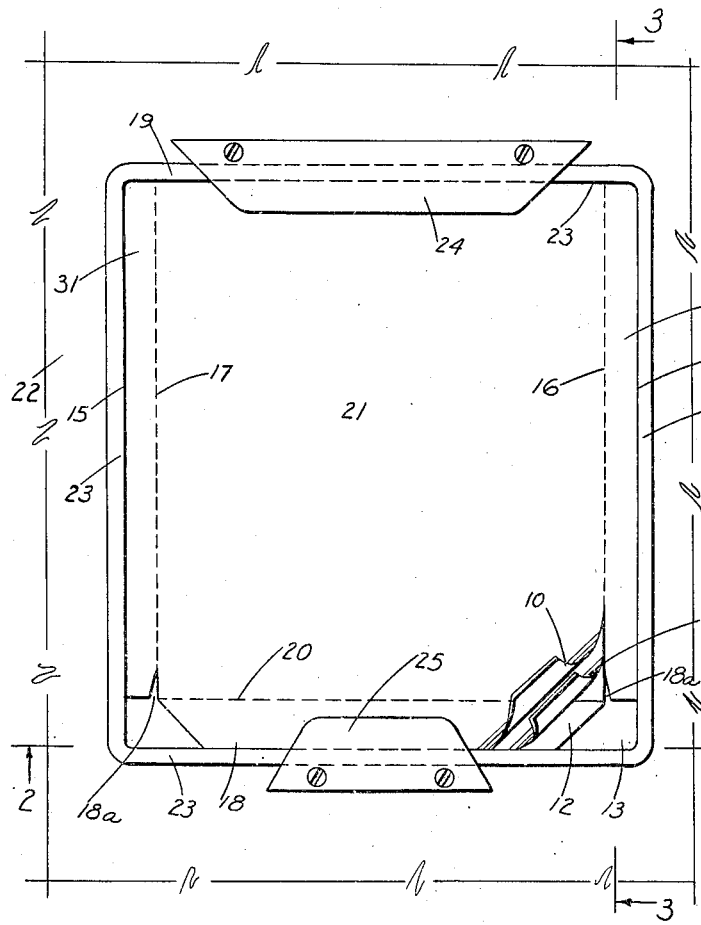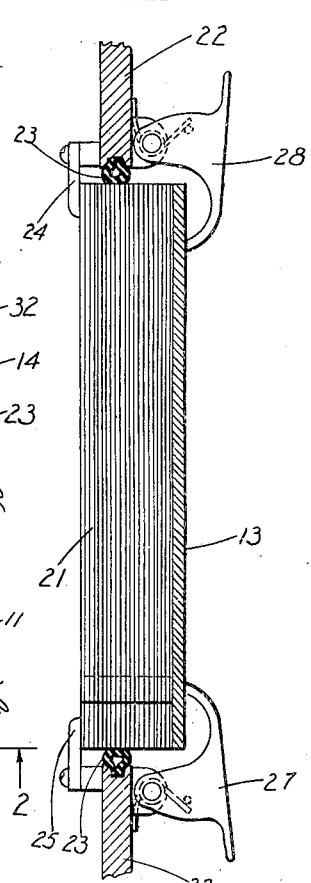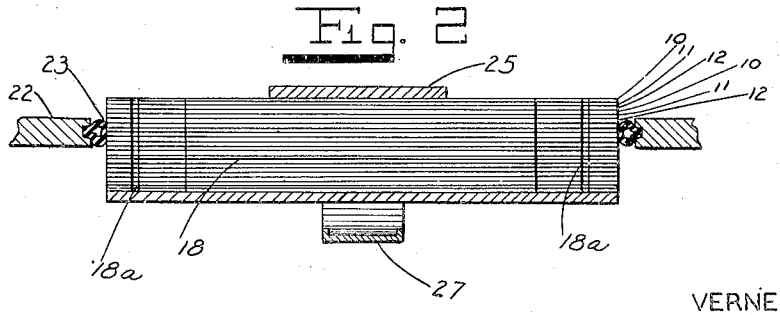

2,488,434

UNITED STATES PATENT OFFICE 2,488,434

PAD OF SENSITIZED PAPER

Verneur E. Pratt and George F. Gray,
Norwalk, Conn.

Application August 30, 1945, Serial No. 613,648

6 Claims. (Cl. 95—19)

1

This invention relates to sensitized paper pads for microfilm printers, but is applicable to other types of printers, projectors and cameras wherein such pads would be useful.

An object of the invention is to provide a pad of sensitized paper for use in a projector as disclosed in the co-pending application Serial Number 581,354, filed March 7, 1945, wherein is disclosed a projector for viewing enlarged images of microfilm on a screen which can also be used to print enlarged images from the microfilm on sensitized paper by projection. The instant invention enables the sensitized paper to be quickly and easily changed in such a device and facilitates its operation when making prints.

Another object is to provide a pad of the character described from which successive sensitized sheets can be removed, leaving the remaining sheets covered by a protective light-tight cover.

Another object is to provide a pad of the character described which will always have the sensitive sheet to be used properly located within the focal plane of the printer regardless of the number of sheets in the pad.

A further object is to provide a pad of the class described which, after a sensitized sheet has been used therefrom, can be removed from the printer and exposed to ordinary daylight without fear of damage to the sensitized sheets remaining in the pad.

Other objects and advantages will be apparent from the following specification, wherein by way of illustration is shown a preferred form of the invention. This comprises a pad for use in the projector-printer shown in the co-pending application aforesaid modified as described herein. It will be apparent that once the inventive concept herein disclosed is understood, many changes in the details of construction can be made without, however, avoiding the appendant claims.

In the accompanying drawings:

Figure 1 is a front plan view of a pad mounted in a printer and illustrating this invention;

Figure 2 is a view of the tab-end of the pad, Figure 1;

Figure 3 is an end view partly in section of the pad and printer shown in Figure 1;

Figure 4 is a side view partly in section showing the pad, Figure 1, in place therein; and Figure 5 is an external side view of the printer, Figure 4, showing a door permitting egress to the pad therein.

Referring to Figure 1, the numeral 10 denotes a sheet of paper, preferably black paper, impervious to light. The numeral 11 indicates a sheet

2 of sensitized paper such as commonly used to make enlargements from microfilm by projecting an image thereon. Obviously, 11 can be any kind of light-sensitive paper, film or the like. 12 is another piece of black paper, and so on, the light-proof paper and sensitized paper alternating through the pad until the backboard 13 is reached.

All the sheets may be glued or stitched together, and to the backboard 13 along their edges 14, 15 to form a pad, and the pad is preferably perforated at 16 and 17 as shown.

The ends of all the sheets extend to the edge 18 of the backboard 13, and are not glued or stitched at this end, but are left free to form tab-like ends which are easily separated. If necessary, the papers at this free end of the pad may be supplied with outwardly extending and staggered index tabs in a manner that will be obvious, but the arrangement shown is satisfactory in most instances.

A cut-back or groove 18a may extend inwardly of the sheets so as to facilitate tearing them off the pad along the perforations 16, 17.

The sheets at the end 19 of the pad are very lightly held together, so that they may be readily detached as hereinafter described. On average sized pads the sheets need not be held together by anything at this end, as the cement along the edges 14, 15 will hold all the sheets flat enough when the pad is in use.

As made up for use, the outside layer or paper 10 is, of course, black, or impervious to light, and the pad may therefore be exposed to light without damage to the underlying light sensitive sheets. Being sealed at edges 14, 15 by glue or stitching, no light penetrates at these points. At the end 19 the sheets so closely overlie each other that the light sensitive sheets are protected, and some opaque glue applied at this edge will prevent the edges from being light struck.

The tab-end 18 of the pad is not sealed above the line 20, Figure 1, and if light penetrates to the edges of the light sensitive sheets, it is not objectionable, as it will never penetrate as far as the dotted line 20 above which is the usable portion of the paper, the tab portion lying below this line, Figure 1, being trim.

The pad, having been assembled as just described, is now ready for use, and is hereafter designated as a whole by the numeral 21.

Referring to Figure 3, the wall of the casing of the printer, camera, or the like, which forms a support for the pad, is indicated at 22. This has a suitable opening having a gasket 23 thereabout, which forms a light-tight seal with the edges of the pad 21 when same is placed in the printer. Positioning means, such as the members 24, 25, are mounted on the inner face of the wall 22 and extend toward each other so as to overlie the edges of the pad, as best seen in Figure 4. These members are preferably transparent where they overlie the pad, so they will not interfere with the image projected on to the pad. They need not overlie the pad any appreciable distance, only a sufficient distance to hold the pad in position.

The inner faces of the members 24, 25 that contact the surface of the pad are in the exact focal plane 26 of the printer. Therefore, when a pad is brought into engagement with these members, the light sensitive surface of an exposed sensitive sheet will be at the focal plane of the printer and in exact focus.

The pad is used in the printer by placing it in the opening in the rear wall 22, where it is held by the spring clips 27, 28, which bear against the backboard 13 of the pad and urge the inner face thereof against the positioning members 24, 25. One of the black papers, such as 10, overlies this face so the pad can with safety be handled in the light and loaded into the printer as just described.

The operator now opens door 29 in a side wall 30 of the printer and, reaching into the printer, picks up one of the corners of sheet 10 on the tab-end 18 and gives it a quick pull which releases it from below member 25. (The operator can ease up the tension on clip 27 while doing this.) The operator then tears the sheet off the pad along perforations 16, 17 and finally, when member 24 is reached, gives the sheet a quick jerk which detaches the sheet from the end 19 of the pad, so it can be removed from the printer.

This leaves the sensitive surface of sheet 11 exposed in the focal plane of the printer as the spring clips 27, 28 force the pad inwardly against members 24, 25 which position the inner surface of the pad in the focal plane.

The paper 11 is exposed in the printer in the usual manner, and then it is detached in the same manner as paper 10. This leaves the next black paper 12 overlying the outer surface of the pad and protecting it from light, the pad moving inwardly and always having its inner surface automatically positioned in the focal plane of the printer as each sheet is detached from the pad. By this arrangement it is impossible to forget to refocus the printer as the pad is used up.

The marginal edges 31, 32 between the perforations 16, 17 and adjacent edges of the pad remain on the backboard 13 until the pad is completely used. These stiff edges remain the same thickness at all times and help with the backboard to keep the working position or surface of the sheets flat and taut, and are not removed sheet-by-sheet for this reason. The thickness of the working portion of the pad, of course, varies with the number of sheets removed from the pad.

The door 29 of the printer can, of course, be replaced by a daylight loading sleeve of any character, whereby all light is excluded from the interior of the printer while manipulating the pad. With most sensitive papers, however, the door 29 may be used, as such papers can be handled in subdued light. Loading in complete darkness is however mentioned, as the inventive concept includes the use of highly sensitive photographic film in place of the sensitized paper 11 and the use of pads including such films for purposes where roll or pack film is undesirable.

The pad herein disclosed does not require a metal casing such as used with the well known film pack, and is easily and cheaply manufactured by automatic machinery in common use in assembling paper pads for other purposes.

What is claimed is:

1. An article of manufacture comprising a pad comprised solely of alternate sheets of light-impervious and light-sensitive material secured to each other along opposite edges whereby said sheets may be stripped from each other by pulling same off the face of the pad in a direction perpendicular to the plane of said sheets.

2. An article of manufacture comprising a pad comprised solely of alternate sheets of light-impervious and light-sensitive material secured to each other along at least two edges of the pad, said sheets being free from each other along one edge of the pad so as to be individually detachable therefrom in a direction perpendicular to the plane of said sheets.

3. An article of manufacture comprising a pad comprised solely of alternate sheets of light-impervious and light-sensitive material secured to each other along parallel edges and perforated on lines parallel to said edges, said perforations being spaced inwardly from said secured edges and extending across all said sheets whereby said sheets are adapted for individual detachment from said pad by pulling each sheet therefrom in a direction perpendicular to the plane of said sheets.

4. An article of manufacture as claimed in claim 3 wherein said sheets are provided with a relatively stiff backboard which extends beyond said perforations at one end of the pad.

5. An article of manufacture comprising a backboard and a plurality of alternately disposed light-impervious and light-sensitive sheets secured to each other along opposite edges and to said backboard to form a pad, and having free tab-ends extending from said sheets lying within the boundaries of said backboard whereby said sheets are adapted for individual detachment from said pad by pulling each sheet therefrom in a direction perpendicular to the plane of said sheets.

6. The article as claimed in claim 5 wherein said sheets are perforated along parallel edges whereby the center portions of said sheets between said perforations may be torn out of said pad and the strips outside said perforations remain attached to said backboard.

VERNEUR E. PRATT.
GEORGE F. GRAY.

REFERENCES CITED

The following references are of record in the file of this patent:

UNITED STATES PATENTS

| Number | Name | Date |
|---|---|---|
| 1,004,670 | Miller | Oct. 3, 1911 |
| 1,077,537 | MacMillan | Nov. 4, 1913 |
| 1,093,341 | Mandel | Apr. 14, 1914 |
| 1,208,321 | Ide | Dec. 12, 1916 |
| 1,483,313 | Rich | Feb. 2, 1924 |
| 1,613,379 | Boniforti | Jan. 4, 1927 |
| 2,112,838 | Griffin | Apr. 5, 1938 |